J. ARMSTRONG, Jr.
Seeding-Machine.

No. 129,386.

Patented July 16, 1872.

Witnesses
R. T. Campbell
J. N. Campbell

Inventor
James Armstrong Jr.

J. ARMSTRONG, Jr.
Seeding-Machine.

No. 129,386.  Patented July 16, 1872.

2 Sheets--Sheet 2.

Witnesses
R. T. Campbell
J. N. Campbell

Inventor
James Armstrong Jr.
by Mason Fenwick & Lawrence
Attys 129,386

UNITED STATES PATENT OFFICE.

JAMES ARMSTRONG, JR., OF ELMIRA, ILLINOIS.

IMPROVEMENT IN SEEDING-MACHINES.

Specification forming part of Letters Patent No. 129,386, dated July 16, 1872.

*To all whom it may concern:*

Be it known that I, JAMES ARMSTRONG, Jr., of Elmira, in the county of Stark and State of Illinois, have invented a new and useful Dropper for Seeding-Machines; and I do hereby declare that the following is a full, clear, and exact description thereof, reference being had to the accompanying drawing making part of this specification, in which—

Figure 1:
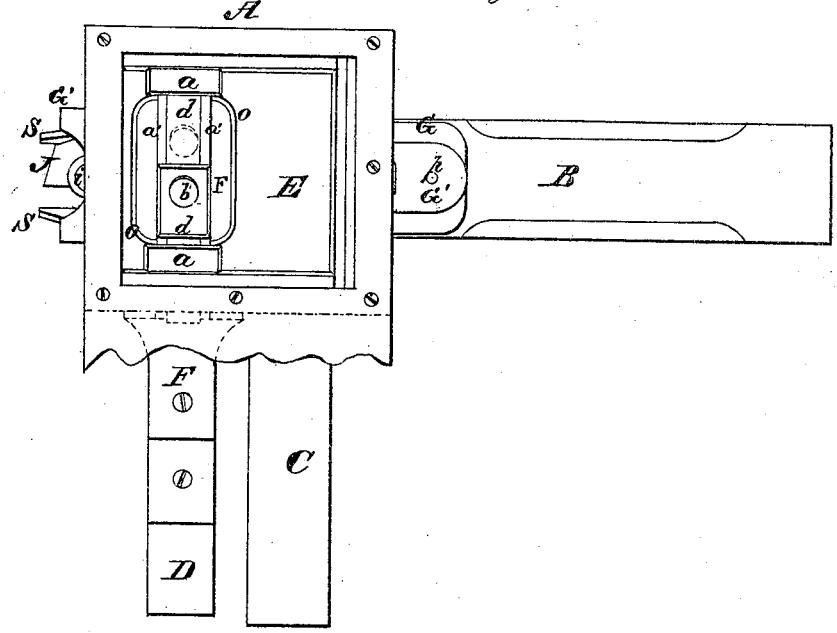
Figure 2:
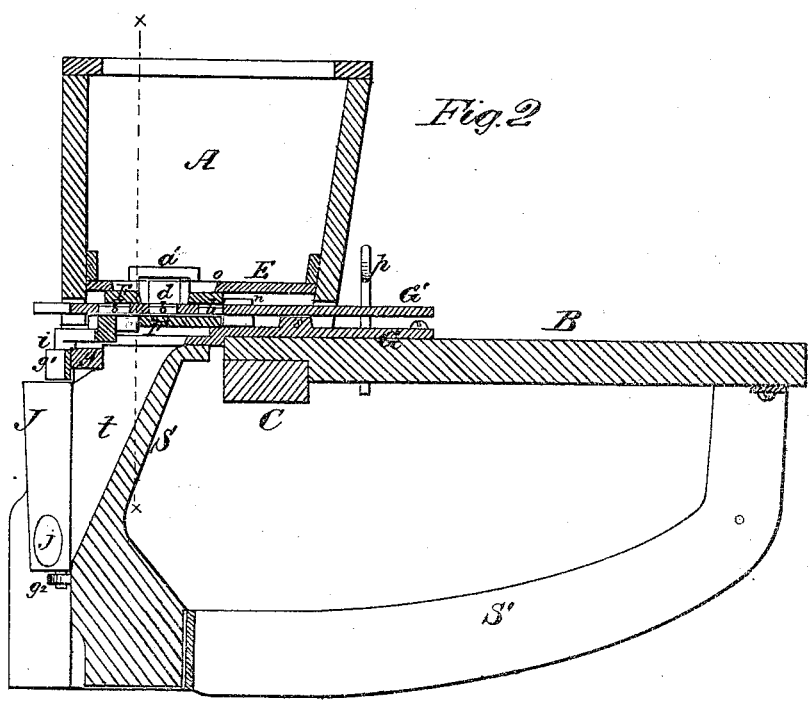
Figure 3:
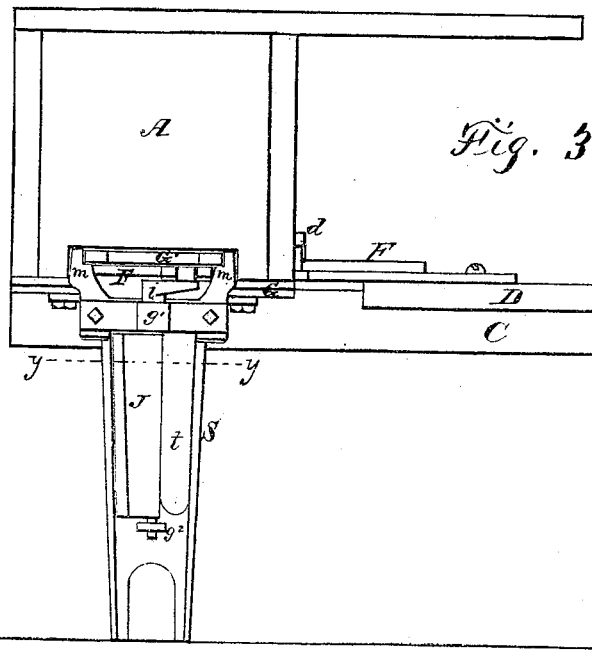
Figure 5:
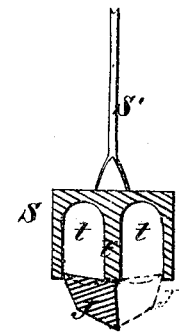
Figure 4:
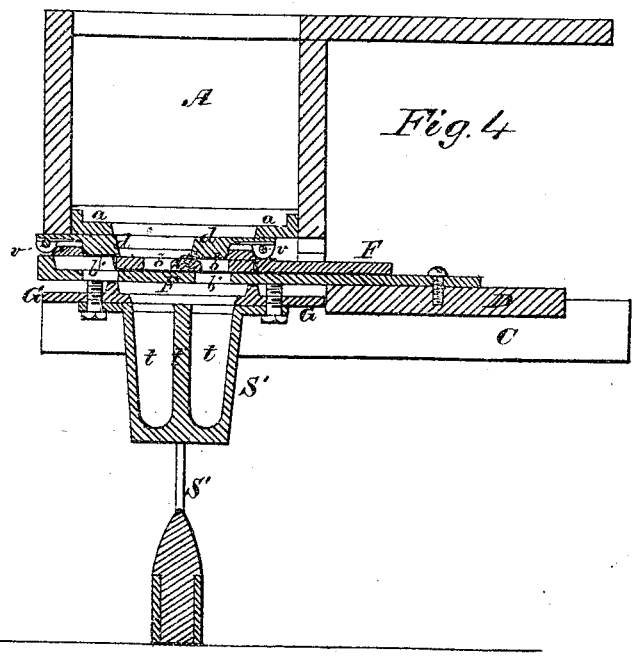

Figure 1, Plate 1, is a top view of one hopper and those parts which are connected therewith for dropping the seed. Fig. 2, plate 1, is a section taken vertically and longitudinally through the center of the hopper, drop-plate, and slide and on one side of the center of the seed tube or guide. Fig. 3, Plate 2, is a rear view of Fig. 1. Fig. 4, Plate 2, is vertical section through Fig. 2 in the plane indicated by dotted line $x$ $x$ thereon. Fig. 5, Plate 2, is a section taken horizontally through Fig. 3 in the plane indicated by dotted line $y$ $y$ thereon.

Similar letters of reference indicate corresponding parts in the several figures.

This invention relates to certain novel improvements on dropping and cut-off devices for seeding-machines, wherein a stationary but adjustable drop-plate is combined with a reciprocating slide, beneath which is a twin tube or channel guide and an oscillating valve for discharging the seed from said channels near the ground. The nature of my invention consists, first, in yielding gravitating cut-offs, which are applied to the seed-slide in such manner that while they operate effectually as cut-offs they will not be liable to crack or injure any grains which might lodge on the edges of the perforations or cells through the stationary drop-plate, as will be hereinafter explained. Second, in constructing the channels in the tube through which the grains are conducted to the ground, so that they taper downward to points or in other words, so that the grains can find no lodgment in the channels except what is alternately offered by the sides of a vibrating valve, as will be hereinafter explained. Third, in utilizing the sides of a prismatic valve to alternately close and open the channels of the seed-tube, as will be hereinafter explained.

The following description of my invention will enable others skilled in the art to understand it.

In the accompanying drawing I have represented only one hopper, A, with the seed-dropping devices arranged beneath it. B and C represent the frame-beams, and D represents the wooden portion of the seed-slide to which the double plate metallic portion is secured. At the junction of the beams B C, and rigidly secured on them, is a plate, G, presenting on its upper surface four guiding-lugs, $m$, for the slide F and drop-plate G′, and an elevated supporting-lug, $s$, for this plate. Between each front and rear pair of lugs $m$ ribs are cast on plate G, on which the slide F is supported, and beneath this slide a rectangular hole is made through the plate G communicating with two channels, $t$ $t$, which are made in a tube or guide, S, and through which the charges of seed descend on their way into the drill. The tube or guide S is bolted to the plate G, and its lower front end is connected to the beam B by means of a kind of colter, S′, which is a curved blade that precedes the tube S, and assists in forming the drill for receiving the seed. This tube presents two channels, $t$ $t$, which are separated by a partition, $t'$, and which taper downward to points, as shown in Fig. 2. On each side of the tube S wings are formed, which extend backward and receive between them a prismatic valve, J, which presents two flat closing sides, near the lower terminuses of which elliptical depressions $j$ are formed into them, which correspond to the lower terminuses of the channels $t$ $t$. This valve is stepped into a lug, $g^2$, which is just below the lower ends of the channels $t$, and its upper end is journaled in a box which is formed by a cap, $g^1$, and a cross-bar, $g$. The journal of the valve has a crank, $i$, formed on it, the wrist-pin of which is received into a slot formed in the rear edge of the lower plate of the slide F.

When the slide is reciprocated the valve J will receive an oscillating motion, and the strokes will be of such length as to cause the flat surfaces of this valve to alternately close and open the backs of the channels $t$ $t$. The closing of a channel by the valve corresponds to the dropping of the seed through the bottom plate of the slide F into such channel. The metallic slide F consists of two plates securely riveted together, with a parallel space between them, through which is passed the drop-plate G', as shown in Fig. 2. The bottom plate of this slide is perforated at b b for allowing the charges of seed to drop from the cells b b into the channels t. The upper plate of this slide impinges closely against the lower side of the metallic hopper-bottom E. There is a slot extending the entire length of the top plate of the slide, in which are two gravitating cut-offs, d d, which are pivoted at v v between raised guides a' a', and which are separated from each other by a sufficient space to allow a free flow of seed to the drop-plate cells b. The cut-offs d d are pivoted at their outer ends so that their inner ends, which are slightly beveled, slide upon the drop-plate G' and alternately strike off and cut off the filled cells b over which they slide. By means of these gravitating cut-offs none of the grain will ever be broken or otherwise injured, for should a grain lodge against the edge of one of the cells b it will cause the cut-off, which is about covering such cell, to rise and slide over such grain leaving it to be subsequently dropped. The bottom plate E of the hopper has an oblong opening, o, through it, the edges of which are beveled and the ends of which are raised, as shown at a a, for receiving the raised cut-offs. The drop-plate which passes between the top and bottom plates of the slide F is secured by a pin, p, outside of the hopper, which pin is passed through either one of three holes made through the drop-plate according to the size of the cells b b, which it is desired to bring into line with the cut-offs d d. There are three pairs of cells through the drop-plate varying in size, so that by adjusting this plate forward or backward and securing it by the pin p the charges of seed to be dropped can be regulated. The cells b are all larger below than above so that the grains will not clog in them, and the adjacent upper edges of each pair of cells are sloped or beveled so that grains lodging upon these surfaces will not be abruptly struck by the ends of the cut-offs.

With reference to the alternate discharge of the charges of seed from the channels t t it will be seen that this is done by a simple oscillating valve, the channels being tapered down to the lower end of this valve so that the grains are not arrested from dropping from a channel when the valve leaves it. This simple contrivance dispenses with the stationary platform at the lower end of a tube, and also with wings on the valve, as hitherto used by me.

Having described my invention, what I claim as new, and desire to secure by Letters Patent, is—

1. Gravitating cut-offs d d pivoted to the reciprocating slide F and working beneath elevations a a of the hopper-bottom E, substantially as described.

2. The gravitating cut-offs d d, arranged in the same line and connected to the slide F so as to bear on the drop-plate G' and to move with said slide, substantially as described.

3. The channels t t, inclining and tapering downwardly, as set forth, so as to present unbroken surfaces from the upper end of the tube S to its back edge, in combination with the prismatic oscillating valve J and its depression j, substantially as and for the purposes specified.

JAMES ARMSTRONG, JR.

Witnesses:
ADAM S. MURCHISON,
DAVID J. WALKER.